UNITED STATES PATENT OFFICE.

GUSTAV MOLT, OF MILLBURY, MASSACHUSETTS.

IMPROVEMENT IN COMPOUND DYES.

Specification forming part of Letters Patent No. 220,638, dated October 14, 1879; application filed August 2, 1879.

*To all whom it may concern:*

Be it known that I, GUSTAV MOLT, of Millbury, in the county of Worcester, State of Massachusetts, have invented a new and useful Compound Dye, of which the following is a specification.

This invention is an improvement on the patent (No. 179,939) granted me July 18, 1876, and differs essentially from that, inasmuch as the dye described therein must be made at the time of use, or in two parts to be put together when used, whereas in this invention the materials are all put together and prepared in a concentrated state, which it is only necessary to dilute with water and apply heat to use, while in its concentrated state it can be put up in a merchantable form in barrels or other receptacles suitable for storage or transportation. It is made by taking fifty pounds of X X indigo, twenty-five pounds of caustic soda, and five pounds of tin crystals, and a sirup made by boiling one pound each of hops and madder, five pounds of bran, and one gallon of molasses in five gallons of water for one hour; then, allowing it to settle, pour off a clear sirup and add to the indigo tin and soda, boiling the whole until the indigo is "sprung" to a yellow color, when it is ready to be barreled; and to the above should be added water enough to make it fill a barrel of thirty-two gallons.

In using my dye for a twelve-barrel vat, take twelve gallons of the above compound for a dark blue, or for a light one, six, with water enough to fill the vat, heat to 130 Fahrenheit, and dip in the usual way, adding more of the compound as often as needed to keep up the color desired.

When very hard water is used a part of dye should be set over night, or the whole allowed to stand several hours before using.

The proportions given for the sirup may be somewhat varied, and in some cases one or more of the parts omitted and a suitable sirup made; but I prefer the materials and proportions given.

What I claim as new, and desire to secure by Letters Patent, is—

The indigo-dye, as above described, consisting of indigo, soda, tin crystals, and the sirup, in the proportions substantially as above, and prepared in the manner set forth, making a merchantable dye, as and for the purposes above set forth and described.

GUSTAV MOLT.

Witnesses:
KELO WANU,
J. G. ARNOLD.